UNITED STATES PATENT OFFICE.

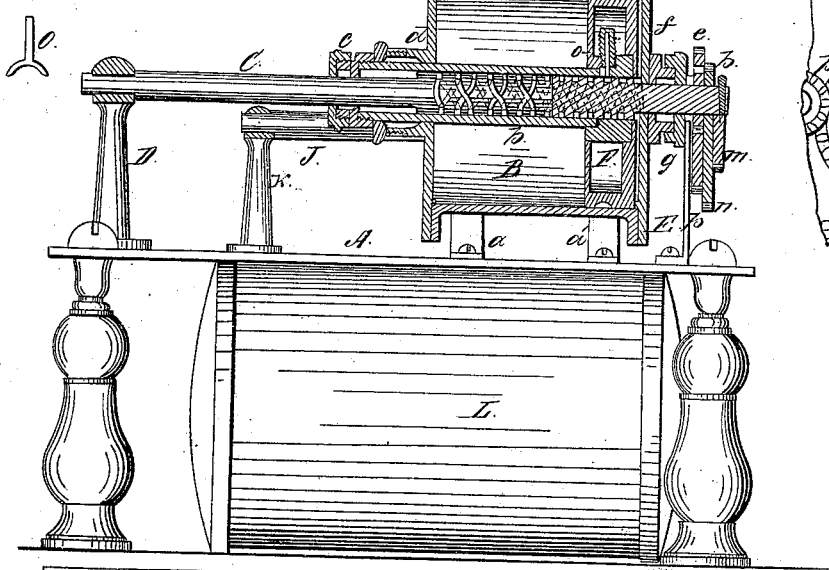

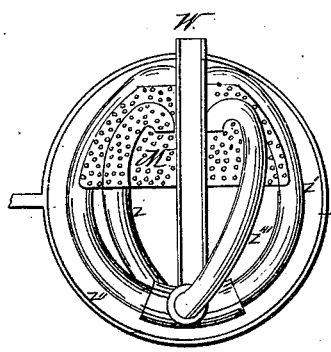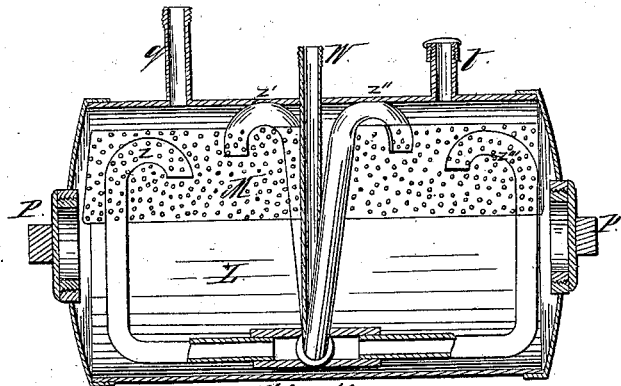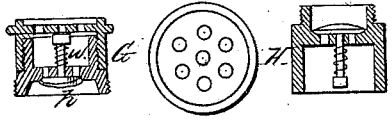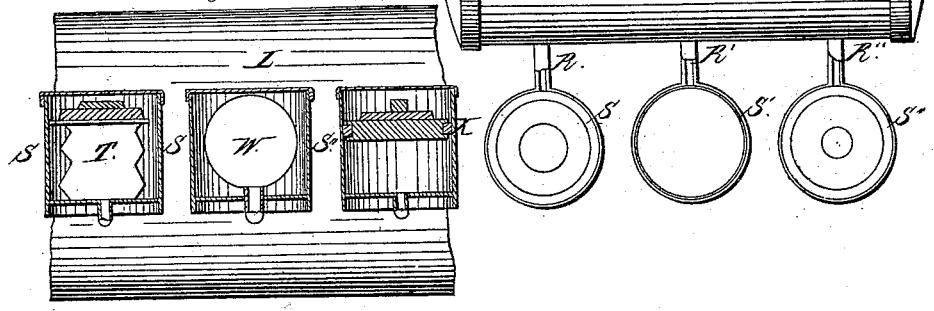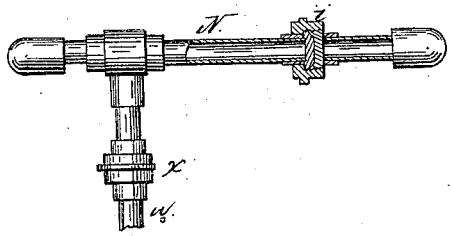

JOHN DAILEY, OF ST. LOUIS, MISSOURI.

IMPROVEMENT IN APPARATUS FOR THE MANUFACTURE OF ILLUMINATING-GAS.

Specification forming part of Letters Patent No. 103,994, dated June 7, 1870.

*To all whom it may concern:*

Be it known that I, JOHN DAILEY, of the city and county of St. Louis, and State of Missouri, have invented a new and useful Improved Apparatus for the Manufacture of Illuminating-Gas, of which the following is a full, clear, and exact description, reference being had to the annexed drawings, making a part of this specification, and in which—

Figure 1 represents a side elevation of my apparatus, with a portion in section. Fig. 2 represents a detail of same. Fig. 3 represents a top plan of same. Fig. 4 represents a detail of same. Fig. 5 represents a transverse section of the tank. Fig. 6 represents a longitudinal section of the tank. Figs. 7, 8, and 9 represent the valve arrangements. Fig. 10 represents a top view of the tank. Fig. 11 represents sectional views of the pressure regulators of the tank. Fig. 12 represents a detail of my apparatus.

Similar letters indicate like parts.

The object of my invention is to produce an apparatus for the manufacture of carbureted-hydrogen gas without the use of fire, water, or heat of any description; but wholly by atmospheric pressure acting on the materials used.

On a bed-plate, A, Figs. 1, 3, resting on legs, as seen in Fig. 1, is placed a cylinder of an air-pump, B, Figs. 1, 3, supported by feet $a\ a'$, Fig. 1, and $a\ a'\ a''\ a'''$, Fig. 3. A shaft, C, Figs. 1, 3, passes through this cylinder, and at one end rests in the standard D, Figs. 1, 3, while the other extremity passes through the arm $e$, Fig. 3, of the standard E, Figs. 1, 2, 3. That part of the shaft C inside of the cylinder is cut with reverse threads or grooves, intersecting each other twice in each revolution, as clearly seen in Fig. 1. A piston, F, Fig. 1, made in two parts, as seen, its faces being united by screws, has screwed to one face a tube, $b$, Fig. 1, which passes through one head of the cylinder, as shown. The shaft C passes through this tube, as well as the heads of the cylinder and the piston, and on the outer end of the tube is an air-tight stuffing-box, $c$, Figs. 1, 3, making an air-tight sliding joint between the tube and the shaft, while to the cylinder-head is screwed a stuffing-box, $d$, Figs. 1, 3, making an air-tight joint between the tube and cylinder-head. A stuffing-box, $g$, Figs. 1, 3, for the other end of C, is screwed to the opposite cylinder-head. In place of the point usually used in connection with a screw of this kind, in order to convert the uniform rotary motion of the shaft into uniform reciprocating rectilinear motion of the piston, I use a rod, $o$, Figs. 1, 4, terminating in a segment, as seen plainly in Fig. 4, the segment being made just long enough to insure that one end of it shall always have completely passed the intersection of the grooves on the shaft before the other end has reached it, thus preventing any possibility of the regular motion of the piston being interrupted by the rod failing to follow the groove, as would very likely be the case were it not provided with this device. In order that the rod may accommodate itself to the pitch of the screw it is made to work freely in a hollow set-screw, $f$, Fig. 1, placed in one part of the piston, by means of which it can be adjusted so as to engage accurately with the shaft. This adjustment having once been properly made will seldom have to be changed.

In either cylinder-head is placed an induction-port, G G', Fig. 3, (shown in section in Fig. 7,) having perforated caps, as seen in Fig. 8. In each port is placed a valve, $h$, Fig. 7, its spindle working in a perforated cross-plate, and having attached to it a spiral spring, $u$, kept in place by a nut on the end of the spindle, as plainly seen in Fig. 7. This spring insures the return of the valve to its seat on the return-stroke of the piston. On either head of the cylinder are also eduction-ports, H H', Fig. 3, (shown in section in Fig. 9,) which also have similar spring-valves, $k$, Fig. 9. The induction and eduction valves are of course so arranged that they open and close at each alternate stroke of the piston, and when one induction-port is open its companion eduction-port in the same head of the cylinder is of course closed.

A shaft, J, Figs. 1, 3, having one bearing in the standard K and the other in E, has on one end a free spur-gear, $l$, Figs. 1, 2, 3, gearing with a pinion, $m$, concentric with and attached to the spur-gear $n$, having its bearing in the arm $e$, and gearing with the pinion $p$, keyed to the shaft C. On the end of J is keyed a ratchet-wheel, r, Fig. 2, with which a spring-pawl, s, fastened to the face of l, engages. On J is wound a cord, Y, Fig. 3, to which is attached a weight. (Not shown.) The wheel l being free on the shaft J, the weight may, by means of a key, be wound up without affecting l; but when the weight causes the shaft to revolve in the other direction the ratchet and pawl cause the wheel l to revolve with the shaft, transmitting its motion through the intermediate gearing to the screw-shaft, which, revolving, gives a reciprocating motion to the piston. The relative diameters and other details of these gearings will of course be determined by the size of the machine and the speed desired to give the piston.

Beneath the bed-plate is placed a tank, L, Figs. 1, 3, 5, 6, 10, 11, in the upper part of which is suspended a perforated basket, M, Figs. 5, 6. Opening into the top of the tank are two pipes, q t, Figs. 6, 10, q, Fig. 3, the former of which is the discharge-pipe for the gas and the latter the supply-pipe of the tank. A third pipe, w, Figs. 6, 10, 12, passes down to the bottom of the tank, and there forms a junction with the four branch pipes z z' z'' z''', Figs. 5, 6, which, curving upward, open into the basket, as seen. In each of these four pipes, near their junction with w, is a small opening. (Not shown.) The pipe w extends up through the bed-plate and connects with the pipe N, Figs. 3, 12, which, as seen in Fig. 3, is connected with the eduction-ports of the air-pump. The connection between w and N is by means of a union-coupling, x, Fig. 12, (shown more clearly at i in the same figure.) The tank is provided with man-holes P P', Fig. 6, by which its interior may be reached. Now, to equalize the pressure and give a regular and uniform flow of gas through the discharge-pipe, I attach to the tank receivers S S' S'', Figs. 10, 11, by means of pipes R R' R'', Fig. 10. These receivers I propose to provide with either one of the three different devices I am about to describe, according as circumstances may determine the one or the other more desirable, each one having, by experiment, been proven to be effective. S, Fig. 11, is provided with a regular bellows, T, weighted on top, as seen, and into this the pipe from the tank opens. In S' is shown an elastic bag, W, having its mouth attached to the pipe from the tank, while in S'' a weighted piston, X, is arranged so as to rise and fall with the gas. The receivers of course are made tight and strong, so that there may not be an undue expansion of the bellows and bag or too great a rise of the piston.

Any one of the solid materials—as charcoal—from which carbureted-hydrogen gas is made being placed in the basket of the tank, and one of the hydrocarbons—as gasoline—poured into the tank, the air-pump is set in motion, when by reason of the arrangement of induction and eduction ports a steady current of air is forced through the pipe w, and, entering the branch pipes, drives the fluid which has entered them through the openings above mentioned into the basket, and at the same time a portion of the air passes out of these pipes into the mass of liquid surrounding them, thus carrying on at the same time the two processes of vaporizing and carbureting. So long as the liquid does not fall below the level of the openings in the branch pipes a continual supply of the liquid will be thrown into the basket, so that all the attention the apparatus requires is to see that the weight has not run down or the supply of fluid fallen too low.

It is evident that in this apparatus all danger of explosion from fire or heat is done away with, since none need ever be brought near the machine, as there is no water to freeze.

The tank need not be placed in the position shown, but may of course be placed wherever most convenient, that in the drawings, however, showing the most compact manner of disposing of it.

What I claim as my invention, and desire to secure by Letters Patent, is—

1. The combination of the cylinder B, revolving shaft C, and sliding tube b, with stuffing-boxes c d, with the piston F, as shown and specified.

2. The combination of the piston F, rod o, and shaft C, the latter having its periphery cut with double intersecting threads or grooves, as and for the purpose specified.

3. The combination of the hollow set-screw f and rod o with the piston of an air-pump, as and for the purpose specified.

4. The induction-ports G G' and eduction-ports H H', in combination with the cylinder B, and arranged relatively to each other, as and for the purpose specified.

5. An air-pump combining the several devices hereinbefore specified, all arranged, constructed, and operated substantially as and for the purpose shown and specified.

6. The gearing composed of the wheels and pinions p m n r l, connected with the shafts C and J, the latter being provided with a weight and cord by which it is set in motion, and all arranged, constructed, and operating as and for the purpose specified.

7. The combination of the tank L, perforated basket M, branch pipes z z' z'' z''', and connecting-pipe w, as and for the purpose shown and specified.

8. The receiver S, containing an air-tight bellows, T, weighted on its top, and having the pipe R, opening into it, in combination with the tank L for the purpose of equalizing and rendering uniform the pressure of the gas therein, as shown and specified.

9. The receiver S', containing an elastic bag, W, into which the pipe R' opens, in combination with the tank L for the purpose of equalizing and rendering uniform the pressure of the gas therein, as shown and specified.

10. The receiver S'', containing a weighted piston, X, made to rise and fall by the pressure of the gas entering beneath it through the pipe R″, in combination with the tank L for the purpose of equalizing and rendering uniform the pressure of the gas therein, substantially as shown and specified.

11. The combination of the tank L, with its perforated basket M, pipes $w\ z\ z'\ z''\ z'''$, and pressure-receiver with a double-acting air-pump arranged and constructed so as to manufacture from any of the vegetable and hydro carbons used for such purposes a pure carbureted-hydrogen gas without using fire, water, or heat of any description, substantially as shown and described.

JOHN DAILEY.

Witnesses:
SAML. S. BOYD,
J. P. GALLAGHER.